UNITED STATES PATENT OFFICE 2,346,735

METHOD OF DETECTING PETROLEUM DEPOSITS

Patrick F. Dougherty, Chester, and Paul D. Barton, Phoenixville, Pa., assignors to Sun Oil Company, Philadelphia, Pa., a corporation of New Jersey No Drawing. Application August 22, 1941, Serial No. 407,954

3 Claims. (Cl. 23—230)

The present invention relates to a method of detecting the presence of subterranean accumulations of hydrocarbons and is more particularly concerned with a method of analysis of cuttings or cores from drill holes for the purpose of determining the proximity of oil or gas producing formations.

It has long been recognized that the lighter hydrocarbons, especially the gases, methane and ethane, escape relatively readily from underground accumulations of oil and gas and eventually find their way to the surface. There has been extensive activity in recent years in developing methods for locating oil and gas producing formations by subjecting samples of earth collected either at or near the surface of the earth, or samples of cores collected in drilling oil and gas wells, to analysis, in order to determine the relative amount of hydrocarbons present therein as an indication of the proximity of accumulations of hydrocarbons to the points from which the samples of earth were obtained. It has generally been considered that when a sample showed a relatively high content of hydrocarbons this indicated that the hydrocarbons had escaped from some accumulation thereof in a subterranean oil or gas producing formation in the near vicinity and had found their way through underground channels to the point where the sample was obtained. In practically all of the proposed methods of analysis, and interpretation of the results obtained by the analysis, the amount of hydrocarbons present in the sample has been determined in relation to the total or the dry weight of the sample. All workers in this field have found great difficulty in interpreting the results obtained by analysis of samples of earth in a manner which will give consistently satisfactory results and it frequently occurs that samples collected in the same general area, and indeed samples collected at closely adjacent points, will show wide variation in the hydrocarbon content of the sample. It has, heretofore, been impossible to give any satisfactory reason for such inconsistencies.

We have discovered that the amount of hydrocarbons, particularly gaseous hydrocarbons, methane and ethane, which a sample of earth may contain, is very greatly affected by the water content of the sample. This is due to the fact that the quantity of gas which can be adsorbed by the dry sample is negligible compared to the quantity of gas which can be absorbed by the water usually associated with the sample. Therefore, assuming that two samples of earth received from underground, or other source, contain substantially the same amount of hydrocarbon gases but that one of the samples has a relatively low water content while the other sample has a relatively high water content, it will be found that the dry sample, on analysis, will show a very low content of hydrocarbon gases, while the wet sample will, on analysis, show a much larger hydrocarbon gas content, due to the fact that more gas is absorbed in the water present in the wet sample, than could be adsorbed by the dry sample. In fact, we have found that the amount of hydrocarbon gases which will be adsorbed by the dry sample of earth is so minute in comparison with the quantity of gas which will be absorbed by the water associated with the sample that for all practical purposes the adsorption of gas by the sample may be disregarded.

Our invention, therefore, is directed to a method of analysis of earth samples and a method of logging wells for locating petroleum deposits, and the like, by means of determining the amount of hydrocarbon gases present in that medium of the samples of earth which are collected which will retain the greatest quantity of gas. That is, we analyze the water present in samples of earth to determine the water's content of hydrocarbon gases.

It is, therefore, an object of our invention to provide a method of analyzing a sample of earth in order to detect the presence of subterranean accumulation of hydrocarbons. In its more specific features it is the object of our invention to provide a method of analyzing water to detect hydrocarbons therein and provide a method of interpreting the results obtained in a satisfactory manner.

Our invention is most readily described by describing in detail a preferred method of practicing the same.

In accordance with our invention, a sample of earth, which may be taken from a shallow hole near the surface or at a point relatively deep in the earth during the drilling of an oil or gas well, and which may consist of either a core or other special sample of earth or some stratum thereof, or of the cuttings obtained in drilling an oil or gas well by the usual methods, is subjected to treatment in order to liberate therefrom any hydrocarbons, particularly hydrocarbon gases, present therein, and the amount of such hydrocarbons is measured and recorded. The sample is also subjected to treatment in order to liberate therefrom any water present therein and the amount of such water is carefully measured and recorded. The amount of hydrocarbons present per part of water is then determined and the relative concentration of hydrocarbons in the water of the sample gives a reliable indication of the proximity of an oil and gas producing formation. A relatively high gas concentration in the water is an indication that there is a strong probability that commercial oil or gas producing formations occur in the vicinity. The formation thus obtained, taken in connection with other known geological data for the particular locality, is of material aid in locating such commercial oil and gas producing formations. It should be understood, of course, that we do not pretend that the methods of the present invention will entirely replace known geological, geophysical and geochemical exploration methods, but our invention should be used in connection with such known methods to supplement them and thus aid in further decreasing the risks in well drilling.

There are several methods available for treating the sample of earth in order to liberate therefrom the gas and moisture present therein and the following specific methods are given more for the purpose of illustration rather than limitation. It should be understood, of course, that the particular method to be employed will vary with the nature of the sample. Probably the simplest method of removing gas and liquids from the sample, and one which is applicable to all types of samples, is to place the sample in a container and heat it therein in order to drive off gas and vaporize moisture present therein. The gas and vaporized moisture liberated in the sample may then be cooled, in order to condense the moisture and any portion of the gas absorbed by the condensed moisture may be removed therefrom by suitable distillation. The amount of water or moisture separated from the sample can then readily be determined, either by weight or volume, and the amount of gas may also be readily determined.

If desired, the sample may be heated under vacuum in order to aid in the more complete removal of gas and moisture therefrom. It is also contemplated that the sample may be ground up into particles of small size in order to aid in the complete removal of moisture and gases therefrom. Another method of assuring complete removal of moisture and gases from the sample is to disintegrate or decompose the sample by treatment by various chemicals. Thus, if the sample is a shale, it may be immersed in a strong salt solution in order to cause it to disintegrate, and after disintegration the water and gases may be separated from the solid portion of the sample by heating and condensation. The amount of water added in the salt solution should be carefully noted so that the water so introduced can be subtracted from the total amount of water removed by heating and only that amount of water originally present in the sample be considered in interpreting the results. In case the sample is a limestone it can be decomposed by an acid such as hydrochloric acid and water and gases removed by distillation and condensation. Here again it is important that the amount of water added with the acid be carefully noted in order that it will not affect the final result.

The gases present in the sample and also, if desired, the water may be removed from the sample by passing an inert gas through the sample, preferably a gas having a high solubility for hydrocarbons, such as carbon dioxide. The gas used for treating the sample is then subjected to analysis in order to determine the amount of gas originally present in the sample and also the water content thereof. Carbon dioxide is particularly useful as a gas for removing gases from the sample, since it may readily be separated from the hydrocarbon gases present in the sample by absorption in an alkaline solution, but if desired, some other gas, such as methane, may be used and the gases subjected to a type of analysis which will disclose the relative amounts of various individual gases present in the sample. The amount of methane used to treat the sample should be carefully noted in order that the amount of this gas which was present in the sample may readily be determined by the difference in weight and volume in the final analysis.

Regardless of the method employed to remove the moisture or water and gases from the samples of earth, the total amount of water removed from the sample is determined and recorded, proper deductions being made for any water added to the sample during its treatment. The amount of gas present in the sample is also determined accurately.

The ratio between the water present and the gas present is then determined and this ratio is used as a basis for determing the probable proximity of the locale from which this sample was obtained to deposits of hydrocarbons; a relatively high water to gas ratio indicating remoteness from such deposits, while a relatively low water to gas ratio indicates that deposits of hydrocarbons may be found in the vicinity from which the samples of earth were obtained. In rough preliminary surveys it may be sufficient to determine the ratio between the amount of water present in the sample and the total amount of gases removed from the sample. However, for more detailed work it is desirable that not only the total amount of gas present be determined, but that the composition of such gas be determined. This is true since in general detectable quantities of methane are found at a greater distance from deposits of petroleum than are the heavier hydrocarbons, such as ethane, propane, butane and the like. Therefore, not only the total amount of hydrocarbons present should be determined, but also the type of hydrocarbons present should be determined; a relatively high amount of heavier hydrocarbons present in the gases obtained from a sample of earth enhancing the probability that petroleum deposits are located in the vicinity.

If desired, the water and gas may, as indicated above, be removed together and the amount of water determined, and then the gas may be separated from the water in any desired manner and the amount of gas present determined.

The reliability of our method of determining, from cuttings or cores from drill holes, the proximity of oil or gas formations to such drill holes may often be demonstrated by comparing samples taken from drill holes at substantially different distances from a known center of a known oil field. It will be found that the ratio of like hydrocarbons to water content will reliably indicate what is known in advance. On the other hand if the water contents of the two samples are substantially different, such tests will often indicate the unreliability of depending upon the hydrocarbon contents of the samples without regard to their water contents. Data based on tests made by us are shown in the following table, in which sample A represents a sample taken at the edge of a known oil field, while sample B represents a sample taken near the center of such field:

| Sample | Total weight of sample | Water in sample | Dry weight of sample | Hydrocarbon gas in sample | Ratio | | |
|---|---|---|---|---|---|---|---|
| | | | | | Gas: water | Gas: dry sample | Gas: total sample |
| | Grams | Grams | Grams | Cc. | | | |
| A | 1,000 | 250 | 750 | 1.5 | 1.5:250 or 1:166 | 1.5:750 or 1:500 | 1.5:1,000 or 1:666 |
| B | 1,000 | 150 | 850 | 1.5 | 1.5:150 or 1:100 | 1.5:850 or 1:566 | 1.5:1,000 or 1:666 |
| C | 1,000 | 100 | 900 | 1 | 1:100 | 1:900 | 1:1,000 |

It will be noted that sample A is a comparatively wet sample, while sample B is a comparatively dry sample. The ratios of hydrocarbon gas to the total weight of the sample are the same. After the removal of the water, the ratio of hydrocarbon gas to the weight of the dry sample is higher in sample B than in sample A, indicating that sample A is closer to the center of the oil formation than sample B, which is contrary to the known fact. On the other hand, the ratio of hydrocarbon gas to water is 67% higher in sample B than in sample A, which gives a result according with the known fact.

Sample C is a hypothetical sample showing so low a ratio of hydrocarbon gas to the weight of the total sample and to its dry weight as to apparently indicate a far greater distance from the center of the oil field than either of the other samples, although, in fact, as the procedure embodying our invention indicates, it is as favorable a sample as sample B and a much more favorable sample than sample A.

We are aware, of course, that when cuttings or cores obtained in the drilling of oil or gas wells by usual methods are the samples employed in practicing our invention, a portion of the water originally present in the sample in the formation may be lost in transit to the surface, also that the sample may be contaminated with water and possibly other fluids in its passage to the surface in the drilling mud. The error introduced, by this loss or gain in water, into the results obtained in accordance with our invention, is, however, substantially constant for samples taken from the same depth and therefore as a general rule, it does not exert any practical effect on the relative value obtained in determining the proximity of oil or gas deposits. If, however, it should be found that in some particular cases the water introduced from the drilling fluid or the water lost by the sample to the drilling fluid, exerts an effect such as to introduce a serious error, this difficulty may be overcome by adding to the drilling fluid some substance to act as a tracer so that the amount of water gained by the sample from the drilling fluid may readily be determined by determining the amount of the tracer present in the sample, or the amount of water gained by the content of the sample may be determined by the difference in weight or volume. Sugar has been found satisfactory as a tracer. Other substances, such as various arsenic compounds, have also been suggested. The tracer, of course, should be some substance readily soluble in water which would not be precipitated by any material apt to be encountered in drilling and for which some delicate quantitative test is available.

What we claim and desire to protect by Letters Patent is:

1. The method of detecting subterranean deposits of petroleum which comprises collecting a sample of earth from a determined location, subjecting such sample to treatment and analysis adapted to determine the amount of water and the amount of low boiling hydrocarbons present therein, comparing the said determinations and ascertaining the ratio between said amounts, and utilizing said ratio as an index of the proximity of the location from which said sample was obtained to deposits of petroleum.

2. The method of detecting subterranean deposits of petroleum which comprises collecting a sample of earth from a determined location, subjecting such sample to treatment and analysis adapted to determine the amount of water and the amounts of relatively light and heavy low boiling hydrocarbons present therein, comparing the several determinations and ascertaining the ratio between the amounts of said hydrocarbons and the amount of the water, and utilizing said ratio as an index of the proximity of the location from which said sample was obtained to deposits of hydrocarbons.

3. The method of detecting subterranean deposits of petroleum which comprises collecting a sample of earth from a determined location, subjecting such sample to treatment and analysis adapted to determine the amount of water and the amount of low boiling hydrocarbons present therein, comparing the said determinations and ascertaining the ratio between said amounts, analzying the low boiling hydrocarbons to determine the composition thereof, and utilizing said ratio in conjunction with the determined composition of said low boiling hydrocarbons as an indication of the proximity of the location from which said sample was obtained to deposits of petroleum.

PATRICK F. DOUGHERTY.
PAUL D. BARTON.